Nov. 6, 1962 R. S. WEBB 3,062,985

IMPEDANCE MATCHING CIRCUIT FOR SPARK MACHINING

Original Filed July 7, 1958 4 Sheets-Sheet 1

INVENTOR.
Robert S. Webb
BY
M K Murphy
ATTORNEY.

IMPEDANCE MATCHING CIRCUIT FOR SPARK MACHINING

Original Filed July 7, 1958 4 Sheets-Sheet 2

INVENTOR.
Robert S. Webb
BY
M K Murphy
ATTORNEY.

INVENTOR.
Robert S. Webb
BY
M K Murphy
ATTORNEY.

IMPEDANCE MATCHING CIRCUIT FOR SPARK MACHINING

Original Filed July 7, 1958 4 Sheets-Sheet 4

INVENTOR.
Robert S. Webb
BY M K Murphy
ATTORNEY.

United States Patent Office 3,062,985
Patented Nov. 6, 1962

3,062,985

IMPEDANCE MATCHING CIRCUIT FOR SPARK MACHINING

Robert S. Webb, Bloomfield Hills, Mich., assignor to Elox Corporation of Michigan, a corporation of Michigan Continuation of application Ser. No. 747,078, July 7, 1958. This application Nov. 8, 1960, Ser. No. 68,134
11 Claims. (Cl. 315—163)

This invention relates to improvements in methods and apparatus for electrical-discharge-machining, sometimes referred to as "E.D.M.," "arc-machining," or "spark-machining," and this application is a continuation of my copending application Serial No. 747,078, filed July 7, 1958.

During recent years, the electrical-discharge-machining process has been used increasingly in the forming of cavities in very hard materials such as tool steels, cemented carbides, and the like. Improvements have been made in rate of machining, accuracy and finish, and in practically all of the modern E.D.M. apparatus now in use, electron tubes are utilized to obtain the rapid interruption of the power circuit that is required for rapid stock removal with good surface finish.

Electron tubes commercially obtainable are severely limited in their current carrying capacity. These devices are high-voltage, low-current devices. The machining gap in E.D.M. apparatus, on the other hand, has a voltage drop of only about 15 volts. The present method of achieving high machining rate is to pass as high as possible current through the gap which necessitates paralleling tubes in banks, sometimes hundreds in number.

For example, in one E.D.M. machine currently in use, a bank of 150 type 6AS7 vacuum tubes connected in parallel comprise the power supply to the machining gap. A 115 volt input supply is connected to the machine and the circuit interruption characteristic is such that power pulses are delivered to the gap having approximately a one-third "on time" or duty factor. The peak current is about 150 amperes and the average current about 50 amperes, the voltage drop through the power circuit being about 100 volts. It is known, however, that 6AS7 tubes and some other types are capable of interrupting circuits with voltages much higher than 115 volts.

Accordingly, it is the principal object of my invention to provide an improved E.D.M. circuit wherein much higher currents are delivered to the machining gap with the same number of vacuum tubes and with substantially the same type of interruption circuit as is now in use.

Another object is to increase the overall power efficiency by a very substantial amount and to make possible utilization of the full voltage carrying characteristic of the tubes.

A further object is to effect a decrease in the bulk and cost of E.D.M. power supplies for given requirements.

Other objects and advantages will become apparent from the following specification which, taken in conjunction with the accompanying drawings, discloses preferred forms of my device.

I accomplish my improved results primarily by matching the relatively high impedance of the vacuum (or gas filled) tube network to the low impedance of the E.D.M. gap discharge. The tubes, being high impedance devices, can withstand relatively high plate voltages but can pass only relatively low currents. In my improved power circuit, I couple the tube bank to the gap through an impedance matching transformer of special design, and convert the high-voltage, low-current power fed to the transformer primary by the tube bank to low-voltage, high current power at the gap.

Figure 19:
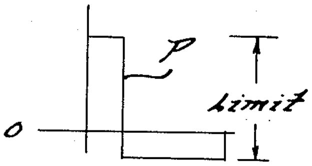
Figure 16:
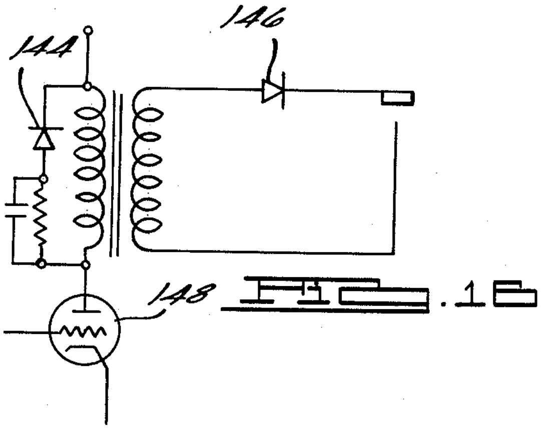
Figure 18:
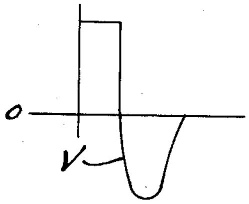
Figure 17:
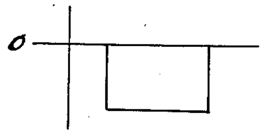
Figures 20, 21, 22, 23, 24, 25, 26:
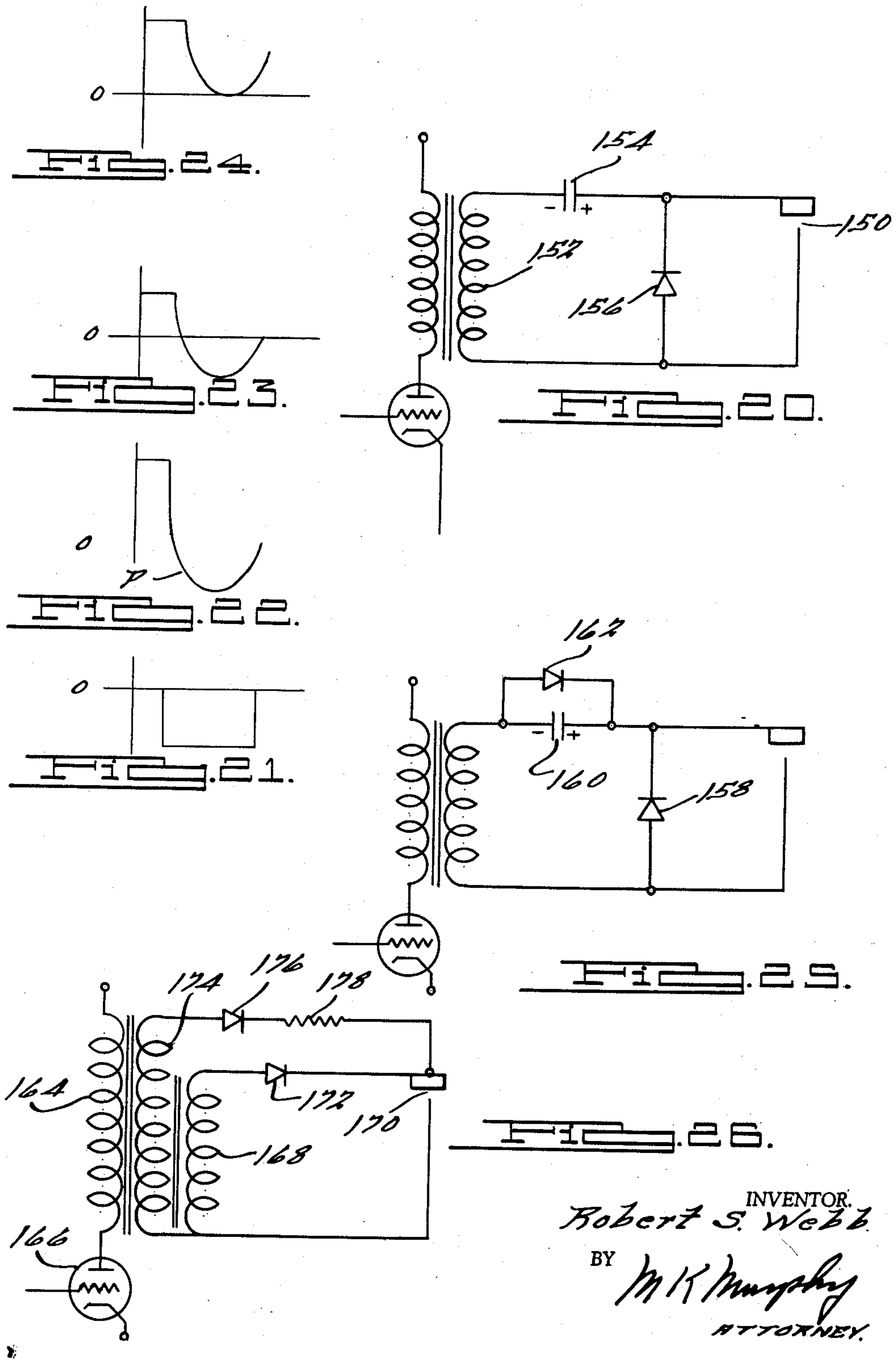

FIGS. 12–15 inclusive, show another modification and set of voltage conditions;

FIG. 16 shows another modification of the power circuit having a damping diode in the primary;

FIG. 17 is the grid drive voltage curve for the FIG. 16 circuit;

FIG. 18 is a typical transformer primary voltage wave form which would be obtained in the FIG. 16 circuit if the damping diode were omitted;

FIG. 19 shows the primary voltage wave form obtained in the FIG. 16 circuit;

FIG. 20 shows a further modification wherein a voltage doubler secondary is used;

FIG. 21 is the grid drive voltage curve for the FIG. 20 circuit;

FIG. 22 is the primary voltage wave form for the FIG. 20 circuit;

FIG. 23 is the secondary voltage wave form for the FIG. 20 circuit;

FIG. 24 is the voltage wave form presented to the gap in the FIG. 20 circuit;

FIG. 25 shows another form of voltage doubler circuit; and

FIG. 26 shows still another circuit for achieving a high striking voltage.

Figure 1:
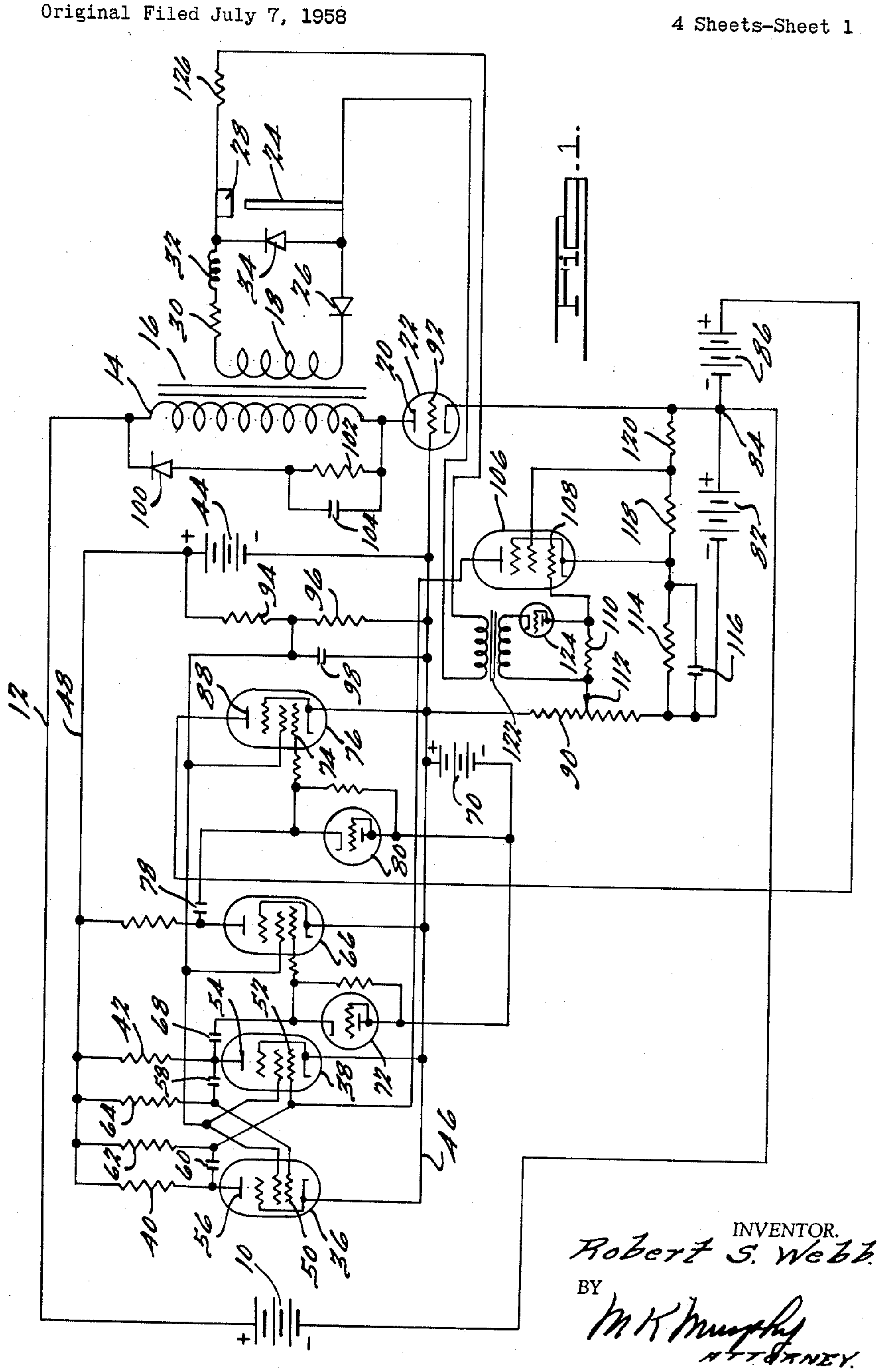
FIG. 1 is a schematic wiring diagram of a typical E.D.M. power supply constructed in accordance with my invention.

Referring to FIG. 1, it will be seen that I have shown at 10 the main power supply for the apparatus, which comprises a 300 volt, D.C. supply, this voltage being about maximum for the plate supply of the 6AS7 power tubes. A lead 12 from the positive side of the power supply connects to one side of primary 14 of the power transformer 16. The latter has a secondary 18 and is of the iron-core type, although an air-core transformer may be used for more delicate machining, particularly finishing operations.

The other side of primary 14 is connected to the anode 20 of a power tube 22. It will be understood that the tube 22 represents a bank of tubes (in this instance 6AS7's) connected in parallel. Almost any number of such tubes may be so connected to provide the required power flow through the gap.

The secondary 18 of the power transformer 16 is connected at one side to the electrode 24 through a blocking diode 26, and at the other side to a workpiece 28. The elements 30 and 32 represent respectively the lumped resistance and lumped inductance of the leads from the secondary 18 to the gap between the electrode and workpiece. The gap is shunted by a second blocking diode 34 as will be explained below.

The power tube bank 22 is controlled by a multivibrator network which comprises tubes 36 and 38. These tubes are preferably pentodes, type 6DQ5. The plates or anodes of these tubes are connected through load resistors 40, 42, and lead 48 to the positive terminal of a suitable power supply 44, the negative terminal of which is connected with the cathodes of the tubes by lead 46. The power supply 44 may be separate or it may be derived from the main supply 10 as desired.

The control grids 50, 52, of the tubes 36, 38, are cross-connected to the anodes 54, 56, respectively through coupling condensers 58, 60, and are connected to the positive side of the multivibrator power supply through the grid resistors 62, 64.

The output signal from multivibrator tubes 36, 38, is fed into an amplifier, which may comprise one or more pentode tubes 66, through condenser 68 and clamped to negative bias voltage 70 through diode 72. The amplified and resquared signal from tube 66 is fed to the grid 74 of pentode 76 (which may be one of a bank) where it is again amplified before being fed to the power tube bank 22. The coupling to the "driver" tube 76 is through a coupling condenser 78 and a clamping diode 80 is provided to insure positive cut-off characteristic. Suitable isolation and signal resistors are also provided as shown to control the operating characteristics of diodes 72 and 80.

The power required to drive the main power tube bank 22 is in the order of several hundred watts, and to obtain increased efficiency, the amplifier 76 is floated in the grid circuit of the bank 22 rather than connected to the negative terminal of power supply 10 as would be expected. Since the control signal appears between the cathode of driver 76 and point 84 of the circuit which is grounded, the network just described, which comprises a multivibrator and two stages of amplification, may be thought of as a floating signal source.

The output signal from this network is of rectangular wave form and is of substantially greater magnitude than that obtained from the conventional square wave generator. Normally these signal generators have an output of approximately ten watts. In the E.D.M. circuit of FIG. 1, the power required to drive the grids of the tube bank 22 is in the order of two hundred watts and more. A booster power supply 86 is preferably provided in series with the bias supply 82 to provide adequate voltage for the plate 88 of driver 76.

Figure 2:
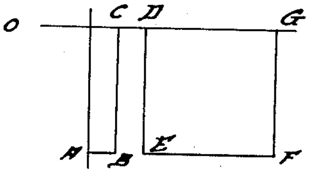
FIG. 2 is a graphical representation of the grid drive voltage of the power tube bank in the above power supply.
Figure 5:
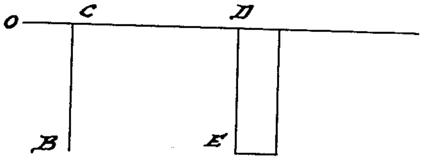
FIGS. 5, 6 and 7 are similar representations of a similar set of conditions, but showing a longer "on time" pulse.

The output signal from driver tube 76 is developed from the voltage drop across variable resistor 90, which signal pulse with the added voltage of power source 82 constitutes the drive to the grids 92 of the bank 22. Proper adjustment of the circuit parameters will provide a signal at grids 92 having a selected on-time characteristic such as indicated in FIGS. 2 and 5, which illustrate graphically two somewhat extreme conditions.

As stated above, the signal generator power supply is the source 44. Resistors 94 and 96, the latter being shunted by a condenser 98, are provided as shown.

The primary 14 of transformer 16 has a damping network consisting of diode 100, resistor 102 and shunt capacitance 104 connected in shunt therewith.

The transformer 16 must be a stepdown transformer capable of handling relatively high currents at relatively high frequencies. The development of extremely thin iron lamination stock and specialized design now makes possible the design of transformers having the characteristics required for the circuit of FIG. 1. The transformer selected should have a maximum voltage swing on the primary equal to the peak voltage rating of the power tube selected and a turns ratio which will match the gap voltage required in E.D.M.

The aforementioned damping network limits the induced voltage or negative fly-back in the primary 14, which occurs between power pulses, to the voltage rating of the tubes 22 and this prolongs the lives of these tubes.

As so far described, it will be seen that the tube bank 22 normally is biased to non-conducting condition by voltage source 82. An amplified signal from the multivibrator will be impressed on the grids 92 of the power bank 22 and will overcome the normal grid bias and render the tube bank conductive. In accordance with the preselected adjustment of the circuit parameters, a voltage will occur across the primary 14 as graphically represented (for example) by FIG. 3, which will induce a voltage in the secondary like that represented in FIG. 4. This secondary voltage is instantly effective across the gap between electrode 24 and workpiece 28, and a power pulse will be delivered across the gap eroding the workpiece. This sequence is repeated at high frequency until the machining operation is completed or the operation interrupted by the machine's power feed, as is known in the art.

The gap between electrode 24 and workpiece 28 is flooded with dielectric fluid during machining as is common in E.D.M.

The circuit of FIG. 1 includes a "watch-dog," which functions automatically to cut-off the power to the gap in event of a short circuit condition, which might damage the workpiece, or in event of malfunction of the apparatus, which might cause damage to the workpiece or to the components of the apparatus.

This "per pulse cut-off" comprises a pentode 106, the control grid 108 of which is connected through a resistor 110 to tap 112, which latter taps the keying resistor 90 at an intermediate point. The grid 108 normally is biased non-conducting by the shunt resistor and condenser network 114, 116, which is connected across the voltage source 82 through the screen voltage resistor 118 and the voltage reducing resistor 120. The voltage across resistor 90 plus that of the source 82 is, of course, the voltage which drives the grids 92 of the power tube bank 22. A selected portion of this voltage is thus effective on the grid 108 of cut-off tube 106 and tends to render tube 106 conductive whenever bank 22 is rendered conductive. The plate of tube 106 is connected to the grid circuit of multivibrator tube 38 by line 107 and conduction through tube 106 will instantaneously cut-off operation of the multivibrator.

However, the secondary of a transformer 122 (called for convenience the "cut-off transformer") is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 18 of power transformer 16 and the gap will fire. This voltage would have to be only about 20 if there were no losses in the firing circuit. However, normal circuit losses require a voltage magnitude of 60 volts or more, and should a short circuit occur across the gap, the short circuit current would be almost 150% of normal. With narrow pulse operation, as graphically illustrated in FIG. 4, the peak current selected is usually the peak pulse rating of the individual tubes of the power tube bank, and a 150% overload of this pulse current would strip the tube cathodes with comparatively few pulses. Thus ordinary short circuit cut-off devices, such as thermally responsive devices, operate too slowly to provide protection.

My per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, where heat checking of the hole being cut might require scrapping of the piece. The readiness of the device to function instantly is constantly maintained by the precise balancing of the circuit parameters. The connection of grid 109 to the keying resistor 90 tends to render tube 106 conductive each time the multivibrator pulses, but the dominating negative bias of the network 114–116 inhibits conduction of tube 106 in the absence of any keying signal. During normal operation, the keying pulse voltage developed across resistor 90 is exactly neutralized in the grid circuit of tube 106 by the action of circuit 122, 124, 110. However appearance of a voltage across primary of transformer 122 (gap voltage) lower than a preset minimum will upset this voltage balance and instantaneously cause tube 106 to conduct and cut off the multivibrator through line 107. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator will, of course, cut off tube bank 22 as well as tube 106. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

Figure 3:
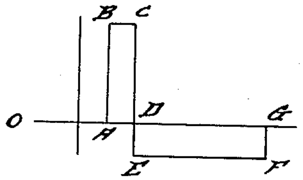
FIG. 3 is a similar representation of the voltage in the primary of the power transformer.
Figure 4:
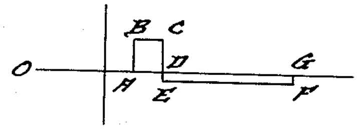
FIG. 4 represents the voltage in the secondary of the power transformer.

Reference is now made to FIGS. 2, 3 and 4, which show graphically voltage conditions in certain portions of the FIG. 1 circuit under one selected set of conditions. FIG. 2 shows the grid drive voltage on the grids of power tubes 22 when a signal of relatively short "on time" per cycle is received from the multivibrator. The point A of FIG. 2 represents the negative grid bias normally impressed on the grids 92. This negative voltage is effective on the grids for portions of the cycle represented by the lines AB and EF. The curve BCDE shows that the grid voltage is rendered positive by at least a sufficient amount to render the tube bank conductive for a period CD, the grids being made negative again, as indicated by DEFG for the remainder of the cycle. FIG. 3 shows that in response to the short pulse received from the power tube bank, a voltage AB is impressed on the primary of transformer 16 for a time BC. FIG. 4 shows the voltage pulse ABCD delivered to the gap between electrode 24 and workpiece 28, the negative flyback of the secondary winding DEFG being blocked from the gap by rectifier 26. Shunt rectifier 34 compensates for any leakage through rectifier 26 which might occur at the high frequencies used. There cannot be, therefore, any reverse polarity pulse across the gap.

Figure 6:
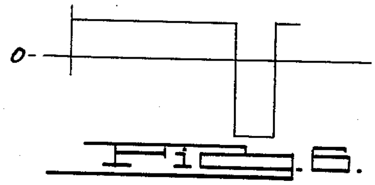
Figure 7:

FIGS. 5, 6 and 7 show a set of conditions similar, respectively, to FIGS. 2, 3 and 4, except that the primary voltage pulse triggered by the multivibrator is of relatively long duration.

In any event, for successful normal operation, the secondary voltage of correct polarity to fire the gap must be of sufficient magnitude to deliver on open circuit enough power to achieve a striking voltage at the gap of at least thirty volts and a sustained voltage in the order of twenty volts, taking into consideration the resistance and inductance of the secondary circuit as indicated in lumped form at 30 and 32.

For a more detailed consideration of the power pulse delivered by the secondary 18, reference is again made to FIG. 3. It is assumed that the transformer 16 has a 5 to 1 ratio, approximately 300 volts being impressed on the primary from the tube bank 22 and 60 volts being available across the secondary 18. The current amplified pulse is indicated by the rectangular wave curve ABCD, which pulse is of correct polarity and power phasing to deliver power to the gap. Flyback voltage DEFG is effectively blocked by rectifier 26 to prevent gap discharge of opposite polarity.

From the foregoing discussion, it is apparent that by "impedance matching transformer," I mean a transformer designed to match the primary voltage swing, which combined with the source voltage is roughly equal to the peak voltage rating of the electronic switch used, to the secondary voltage required to cause firing of and sustain conduction through the gap and secondary impedances at a current level reflected to the primary roughly equal to the current rating of the electronic switch.

In the specific examples given the electronic switch is a vacuum tube bank; however, in reality, it may be any device such as a transistor having a power circuit controlling or gating ability wherein a pulsating signal of relatively smaller power magnitude than the output connected to the input is capable of rendering its power circuit conductive or nonconductive by means of an electrical bias rather by than mechanical closure as in a relay. Such electrical control is, of course, the only means of switching power On and Off at repetition rates above 10,000 cycles per second. Similarly by this example, a thyratron is not an electronic switch since its control circuit is capable only of turning on the output power and depends upon other means for rendering it nonconductive.

Figure 10:
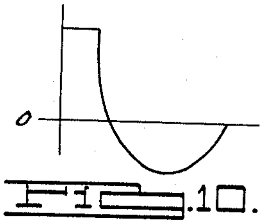
FIG. 10 shows the transformer primary voltage.
Figure 8:
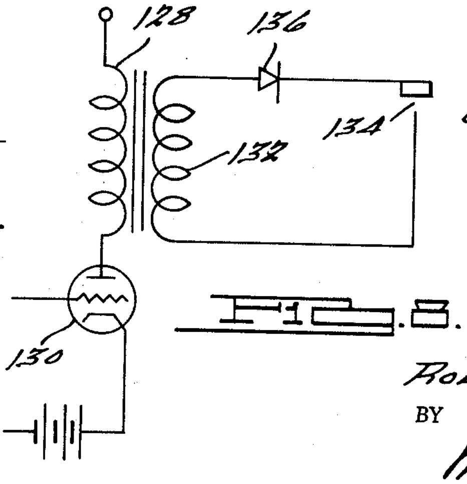
FIG. 8 shows a modification of the power supply circuit.
Figure 11:
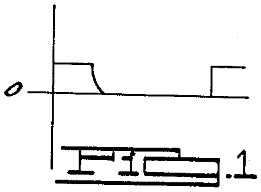
FIG. 11 shows the rectified secondary voltage.
Figure 9:
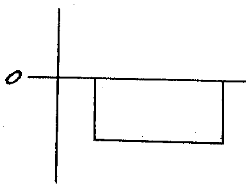
FIG. 9 is the grid drive voltage curve of the power tube bank in the FIG. 8 circuit.
Figure 14:
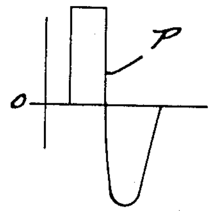
Figure 13:
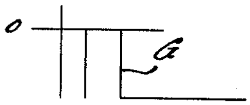

Referring now to FIGS. 8 to 11 inclusive, FIG. 8 shows schematically a modification of the transformer circuit wherein the primary 128 is fed from the power tube bank 130 and secondary 132 feeds gap 134 through a half wave rectifier 136. In response to the grid drive voltage of FIG. 9 on tubes 130, the primary pulses as shown in FIG. 10 and induces a rectified secondary voltage as shown in FIG. 11.

Figures 12, 15:
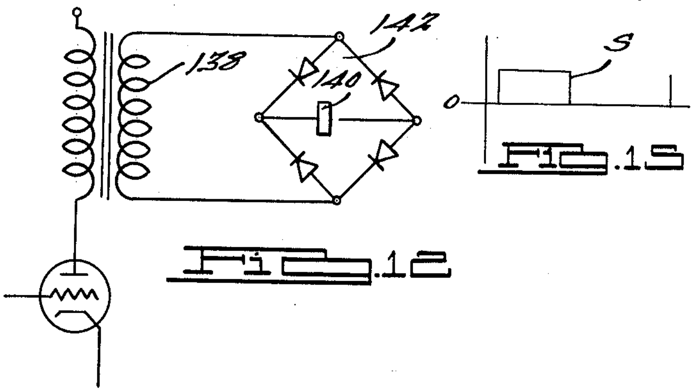

FIG. 12 shows a variation of the power circuit to the gap wherein the transformer secondary 138 power is fed to the gap 140 through a full wave rectifier bridge 142, which converts the negative swing of the secondary voltage to positive striking voltage. The grid drive here is typically in wave form G (FIG. 13), the transformer primary wave form is like P (FIG. 14) and the gap wave form is shown at S in FIG. 15. Here the negative flyback is substantially wholly rectified and fed to the gap 140.

In the modification of FIG. 16, a damping diode 144 is connected in the primary circuit like FIG. 1, and a rectifier 146 is connected in the secondary output like FIG. 8. In this circuit, grid drive G (FIG. 17) produces a primary wave form P shown in FIG. 19. FIG. 18 shows the primary voltage wave form which would occur if the damping diode 144 were omitted, which wave form would result in blowing of tubes 148 because of the excessive negative induced voltage V.

FIG. 20 shows a further modification in which a voltage doubler secondary circuit is used. In this circuit, the grid drive of FIG. 21 produces a primary voltage wave shown in FIG. 22 which, in turn, induces the secondary voltage wave of FIG. 23. The voltage presented to the gap 150 from secondary 152 is shown graphically in FIG. 24. In this circuit, the negative flyback of the primary P (FIG. 22) induces in the secondary 152 a voltage which, through the rectifier 156, charges the condenser 154 in the positive or striking polarity. The normal in-phase pulse added to the stored negative pulse causes the gap to fire; thus the full peak voltage (FIG. 24) is delivered. This circuit takes full advantage of the peak to peak voltage of the transformer.

FIG. 25 is another form of voltage doubler circuit. Here, rectifier 158 and condenser 160 are of relatively small capacity, the voltage stored in condenser 160 being used principally for striking with the gap power being delivered mostly through rectifier 162. This circuit is most useful when gap currents are such that losses in condenser 160 become excessive.

FIG. 26 shows still another form of circuit for obtaining a high striking voltage. In this form, the primary 164 is pulsed by power tubes 166, and the regular secondary 168 is connected to gap 170 through rectifier 172. An additional secondary winding 174 of relatively low power, high voltage characteristic is connected in parallel to the gap through rectifier 176 and resistor 178. Here, the full voltage of winding 174 is applied to the gap 170, in parallel with the voltage of the winding 168. Once the gap is fired, the current buildup will, for all practical purposes, cut winding 174 out of the circuit because of loading of the resistor 178. Substantially all of the power to the gap will be delivered by winding 168. The characteristic of secondary winding 174 may be chosen to provide almost any desired striking voltage as this higher voltage is blocked from winding 168 by rectifier 172. This permits the latter winding to be designed for optimum power delivery to the gap.

It will thus be seen that I have shown and described a matched impedance power supply circuit for delivering pulsed power to an E.D.M. gap and several modifications of same to conform to various requirements.

I claim:

1. Apparatus for machining a conductive workpiece by intermittent-electrical-dischrage across a gap between an electrode and the workpiece which comprises a source of unidirectional current, an electron tube bank operatively connected to said source, a pulser connected in the grid circuit of said bank for rendering said bank alternately conductive and non-conductive, an impedance matching transformer having its primary winding connected to the output of said tube bank and its secondary winding connected across said gap, and a one-way current conducting device connected in series with said secondary winding for blocking the induced secondary voltage between pulses from the gap.

2. Apparatus for machining a conductive workpiece by intermittent electrical discharge across a gap between an electrode and the workpiece which comprises, a source of unidirectional current, a vacuum tube bank operatively connected to said source, a pulser connected in the grid circuit of said bank for rendering said bank alternately conductive and nonconductive, an impedance matching transformer having its primary winding connected to the output of said tube bank and its secondary winding connected across through a one-way current conducting device to said gap, said transformer secondary winding having the characteristic of handling currents in the order of five amperes and higher at frequencies above 15,000 cycles per second and said primary winding having a maximum voltage swing substantially equal to the peak voltage rating of said vacuum tube bank, said transformer having a secondary winding turns ratio matching the desired gap voltage.

3. Apparatus for machining a conductive workpiece by intermittent-electrical-discharge across a gap between an electrode and the workpiece which comprises, a source of unidirectional current, an electron tube bank operatively connected to said source, a pulser connected in the grid circuit of said bank for rendering said bank alternately conductive and non-conductive, an impedance matching transformer having its primary winding connected to the output of said tube bank and its secondary winding connected across said gap, and damping means connected across said primary winding for limiting the primary flyback voltage between pulses to a maximum equal to or below the voltage rating of said tube bank.

4. Apparatus for machining a conductive workpiece by intermittent-electrical-discharge across a gap between an electrode and the workpiece which comprises, a source of unidirectional current, an electron tube bank operatively connected to said source, a pulser connected in the grid circuit of said bank for rendering said bank alternatively conductive and non-conductive, an impedance matching transformer having its primary winding connected to the output of said tube bank and its secondary winding connected across said gap, and a damping network comprising a diode and resistor connected in series and a condenser shunted across said resistor, connected across said primary winding for limiting the induced voltage in the primary between pulses to the maximum voltage rating of said tube bank.

5. Apparatus for machining a conductive workpiece by intermittent-electrical-discharge across a gap between an electrode and the workpiece which comprises, an electron tube bank, a pulser connected in the grid circuit of said bank for rendering said bank alternatively conductive and non-conductive, an impedance matching transformer having its primary winding connected to the output of said tube bank and its secondary winding connected across said gap, and a damping network comprising a diode and resistor connected in series connected across said primary winding for limiting the induced voltage in the primary between pulses to the maximum voltage rating of said tube bank.

6. Apparatus for machining a conductive workpiece by intermittent-electrical-discharge across a gap between an electrode and the workpiece which comprises, an electron tube bank, a pulser connected in the grid circuit of said bank for rendering said bank alternately conductive and non-conductive, an impedance matching transformer having its primary winding connected to the output of said tube bank and its secondary winding connected across said gap, and a network comprising a first blocking diode series connected in the lead between said secondary winding and the gap and a second blocking diode connected across said gap whereby the secondary flyback voltage occurring between pulses is substantially blocked from the gap and reverse polarity discharges across the gap are prevented.

7. In an electrical-discharge machining apparatus for eroding a conductive workpiece by intermittent electrical discharge across a gap between an electrode and a workpiece in the presence of a dielectric coolant, a unidirectional current power supply, means for pulsing said power supply thereby to produce a series of timed, short-duration, power pulses, and means coupling said power supply to the gap comprising an impedance matching transformer having its primary winding connected to said power supply and its secondary winding connected across said gap and including a half-wave rectifier connected in series with said secondary winding and said gap.

8. In an electrical-discharge machining apparatus for eroding a conductive workpiece by intermittent electrical discharge across a gap between an electrode and a workpiece in the presence of a dielectric coolant, a unidirectional current power supply, means for pulsing said power supply thereby to produce a series of timed, short-duration, power pulses, and means coupling said power supply to the gap comprising an impedance matching transformer having its primary winding connected to said power supply and its secondary winding connected across said gap, and a full wave rectifier connected between said secondary winding and said gap.

9. In an electrical-discharge machining apparatus for eroding a conductive workpiece by intermittent electrical discharge across a gap between an electrode and a workpiece in the presence of a dielectric coolant, a unidirectional current power supply, means for pulsing said power supply thereby to produce a series of timed, short-duration, power pulses, and means coupling said power supply to the gap comprising an impedance matching transformer having its primary winding connected to said power supply, a network comprising a damping diode and a resistor in series connected across said primary winding for reducing the primary flyback voltage, and means connecting the transformer secondary winding across said gap through a rectifier.

10. The combination set forth in claim 9 wherein said network includes a condenser connected across the resistor thereof.

11. The apparatus for machining a conductive workpiece by intermittent electrical discharge across a gap between an electrode and the workpiece which comprises, a source of machining power, an electronic switch connected between said power source and said gap, a pulser operably connected to said electronic switch and rendering said switch alternately conductive and non-conductive at predetermined frequency, an impedance matching transformer having its primary winding connected to said electronic switch and its secondary winding connected across said gap through a one-way current conducting device, said transformer secondary winding having the characteristic of handling currents in the order of five amperes and higher at frequencies above 15,000 cycles per second and the primary winding having a maximum voltage swing substantially equal to the peak voltage rating of said electronic switch, said transformer having a secondary winding turns ratio matching the desired gap voltage.

References Cited in the file of this patent

UNITED STATES PATENTS

| | | |
|---|---|---|
| 2,876,386 | Feder et al. | Mar. 3, 1959 |
| 2,951,142 | Ullmann | Aug. 30, 1960 |

UNITED STATES PATENT OFFICE
CERTIFICATE OF CORRECTION

Patent No. 3,062,985 November 6, 1962

Robert S. Webb

It is hereby certified that error appears in the above numbered patent requiring correction and that the said Letters Patent should read as corrected below.

Column 6, line 17, for "rather by than" read -- rather than by --; column 7, line 42, strike out "across".

Signed and sealed this 9th day of April 1963.

(SEAL)
Attest:

ESTON G. JOHNSON

Attesting Officer

DAVID L. LADD

Commissioner of Patents